( 12 ) United States Patent
Krikke et al.

(10) Patent No.: US 9,594,481 B2
(45) Date of Patent: Mar. 14, 2017

(54) METHOD FOR SELECTING A DIGITAL OBJECT ON A USER INTERFACE SCREEN IN COMBINATION WITH AN OPERABLE USER INTERFACE ELEMENT ON THE USER INTERFACE SCREEN

(71) Applicant: OCE TECHNOLOGIES B.V., Venlo (NL)

(72) Inventors: Nanne Krikke, Nijmegen (NL); Jacoba A. H. Jansen, Venlo (NL); Pascal A. M. S. Hagens, Kevelaer (DE)

(73) Assignee: OCE-TECHNOLOGIES B.V., Venlo (NL)

( * ) Notice: Subject to any disclaimer, the term of this patent is extended or adjusted under 35 U.S.C. 154(b) by 261 days.

(21) Appl. No.: 14/075,491

(22) Filed: Nov. 8, 2013

(65) Prior Publication Data

US 2014/0143727 A1 May 22, 2014

(30) Foreign Application Priority Data

Nov. 21, 2012 (EP) ..................................... 12193555

(51) Int. Cl.
*G06F 3/0482* (2013.01)
*G06F 3/0484* (2013.01)
*G06F 3/0488* (2013.01)

(52) U.S. Cl.
CPC ........ *G06F 3/04842* (2013.01); *G06F 3/0482* (2013.01); *G06F 3/0488* (2013.01)

(58) Field of Classification Search
CPC G06F 3/0482; G06F 3/0488; H04M 1/72583; H04N 5/44543; H04N 21/4858
USPC .................................. 715/779, 808, 810, 835
See application file for complete search history.

(56) References Cited

U.S. PATENT DOCUMENTS

| 6,968,511 B1 | 11/2005 | Robertson et al. |
| 8,161,400 B2 * | 4/2012 | Kwon ........................... 715/769 |
| 2006/0020904 A1 | 1/2006 | Aaltonen et al. |

(Continued)

FOREIGN PATENT DOCUMENTS

| EP | 0 994 408 A2 | 4/2000 |
| EP | 1 557 809 A1 | 7/2005 |

(Continued)

*Primary Examiner* — Rinna Yi
(74) *Attorney, Agent, or Firm* — Birch, Stewart, Kolasch & Birch, LLP

(57) ABSTRACT

A method for displaying a plurality of digital objects on a user interface screen includes displaying at least two digital objects on the user interface screen, selecting a digital object, and displaying an operable user interface element by adding the operable user interface element to the selected digital object in a non-overlapping way with at least the non-selected digital objects. The operable user interface element represents a function to be applied on the digital item corresponding to the selected digital object when the operable user interface element is operated. The operable user interface element is displayed at an initial position and the displaying of the operable user interface element includes hiding the selected digital object at the initial position and displaying the selected digital object by adding the selected digital object to the operable user interface element which stays at the initial position on the user interface screen.

12 Claims, 16 Drawing Sheets

(56) References Cited

U.S. PATENT DOCUMENTS

| | | | |
|---|---|---|---|
| 2006/0200517 A1* | 9/2006 | Nelson | H04L 65/4023 709/204 |
| 2007/0094610 A1* | 4/2007 | Pak et al. | 715/800 |
| 2008/0094421 A1 | 4/2008 | Maeda | |
| 2008/0148191 A1 | 6/2008 | Weinlander | |
| 2008/0172395 A1* | 7/2008 | Lee et al. | 707/10 |
| 2008/0256454 A1 | 10/2008 | Latzina et al. | |
| 2011/0161878 A1 | 6/2011 | Stallings et al. | |
| 2012/0072869 A1* | 3/2012 | Odagawa et al. | 715/810 |
| 2012/0185768 A1 | 7/2012 | Dowd | |
| 2013/0088450 A1* | 4/2013 | Takase et al. | 345/173 |

FOREIGN PATENT DOCUMENTS

| | | |
|---|---|---|
| EP | 1 693 738 A1 | 8/2006 |
| EP | 1739533 A2 | 1/2007 |
| EP | 1 777 950 A2 | 4/2007 |
| EP | 2166445 A2 | 3/2010 |
| EP | 2339443 A1 | 6/2011 |
| WO | WO 2005/078564 A1 | 8/2005 |

\* cited by examiner

METHOD FOR SELECTING A DIGITAL OBJECT ON A USER INTERFACE SCREEN IN COMBINATION WITH AN OPERABLE USER INTERFACE ELEMENT ON THE USER INTERFACE SCREEN

CROSS-REFERENCE TO RELATED APPLICATIONS

This application claims priority under 35 U.S.C. §119 to application Ser. No. 12/193,555.5, filed in Europe on Nov. 21, 2012, the entirety of which is expressly incorporated herein by reference.

BACKGROUND OF THE INVENTION

1. Field of the Invention

The present invention relates to a computer-implemented method for displaying a plurality of digital objects on a user interface screen of an electronic system, each digital object representing a digital item, the method comprising the steps of displaying at least two of the plurality of digital objects on the user interface screen and selecting a digital object of the plurality of digital objects.

2. Description of Background Art

User interface screens are known which display a digital object which represents a digital item such as a user mail box, a document, a group or list of documents or a group or list of user mail boxes. The user mail box may comprise at least one document. Such a digital object is stored in a memory of the electronic system and may be selected by a pointing device like a mouse, a human finger, a stylus etc. Such a digital object may also be selected automatically, for example the last used or most recent digital object is automatically selected. The user interface screen usually comprises operable user interface elements, like action buttons. Each operable user interface element represents a specific operation which is activated when a piece of underlying function code program is executed. When a digital object is selected, the digital object may be suitable for applying an action upon the digital item which is represented by the digital object. Such an application of an action may be executed by activating the corresponding action button. Such a user interface screen is shown in FIG. 3. A user interface screen 3 displays a plurality of digital objects 31-35 ordered in a list on the user interface screen and an action button 24 comprising an icon 41 indicating that the action corresponding to the action button is a print action. Firstly, a digital object of the plurality of digital objects 31-35 has to be selected by pointing at, tapping at or pressing on the digital object and secondly the action button 24 has to be activated by pointing at, tapping at or pressing on the action button 24.

SUMMARY OF THE INVENTION

It is an object of the present invention to improve the display of a digital object in combination with the application of an action upon the digital object.

According to the present invention, this object is achieved by a computer-implemented method for displaying a plurality of digital objects on a user interface screen of an electronic system, each digital object representing a digital item, the method comprising the steps of displaying at least two of the plurality of digital objects on the user interface screen and selecting a digital object of the plurality of digital objects, and in response to selecting the digital object, displaying an operable user interface element by adding the operable user interface element to the selected digital object in a non-overlapping way with at least the non-selected digital objects of the plurality of digital objects, which operable user interface element represents a function to be applied on the digital item corresponding to the selected digital object when the operable user interface element is operated.

By executing the steps according to the method, the selection of a digital object and an application of an action to the selected digital object are more intuitive for the user since the digital object and the operable user interface element form a unity (object) upon selection of the digital object. This is advantageous, since a selected digital object is usually the object on which an intended user action is to be applied. The non-selected digital objects are still completely visible on the user interface screen due to the non-overlapping manner of displaying of the non-selected digital objects versus the selected digital object and the added operable user interface element according to the present invention. The addition of the operable user interface element may comprise displaying the operable user interface element adjacent to the selected digital object or may comprise displaying the operable user interface element completely within the boundaries of the digital object leaving space for the digital object to be visible. If the digital object is already visible on the user interface screen, the digital object may be selected by a mouse click, pointing gesture, a tap of a finger or stylus, etc. If the digital object is not visible on the user interface screen, but is an element of a scrollable list of digital objects, which list is partially visible on the user interface screen, the digital object may be selected by or after scrolling through the list of digital objects. A selection by scrolling through the list of digital objects may be implemented by swiping in the case of a touch screen and snapping to a digital object from the list at a predetermined position at the user interface screen. A selection after scrolling through the list of digital objects may be implemented as receiving an input selection of the user after the list has come to a standstill.

According to an embodiment, the method comprises the further step of displaying the operable user interface element on the user interface screen before the selection of the digital object. This is advantageous, since the operable user interface element will always be visible on the user interface screen; in other words, the visibility of the operable user interface element is independent of the fact that a digital object on the user interface screen is selected or not. A default selection may be implemented, for example a first digital object from a list, a last added digital object, etc. In case of the default selection, the operable user interface element may be displayed in addition to one of the at least two visible digital objects on the user interface screen, which one digital object has been predetermined.

According to an embodiment, the operable user interface element is displayed at an initial position and the step of displaying the operable user interface element comprises the step of hiding the operable user interface element at the initial position and displaying the operable user interface element by adding the operable user interface element to the selected digital object which stays at the initial position on the user interface screen. This is advantageous, because an order or sequence of the digital objects on the user interface screen remains as it is. Another advantage is that the distance for mouse or finger movements is minimized for a selection of a digital object in combination with an activation of a function which is to be applied on the selected digital object.

The hiding and added displaying of the operable user interface element may also be implemented as instantaneously or progressively moving the operable user interface element.

According to an embodiment, the operable user interface element is displayed at an initial position and the step of displaying the operable user interface element comprises the step of hiding the selected digital object at the initial position and displaying the selected digital object by adding the selected digital object to the operable user interface element which stays at its initial position on the user interface screen. In this way, the operable user interface element stays at the same position on the user interface screen and is easily retrieved by the user. The hiding and added displaying of the selected digital object may also be implemented as instantaneously or progressively moving the digital object.

According to an embodiment, the operable user interface element is displayed adjacent to the selected digital object on the user interface screen in a non-overlapping way with the selected digital object. This is advantageous, since the selected digital object stays completely visible on the user interface screen. Metadata such as a job name, a file name, a document title, displayed on the digital object are also still completely visible.

According to an embodiment, the step of displaying the operable user interface element adjacent to the selected digital object comprises the step of downsizing the digital object to create an amount of free space on the user interface screen and displaying the operable user interface element adjacent to the downsized digital object within the created free space on the user interface screen. The area occupied by a selected downsized digital object together with the adjacent operable user interface element is not larger than the area occupied by the original digital object. This is, in particular, advantageous when a list of digital objects is displayed and each digital object has the same size. A selected digital object in the list keeps alignment with the other digital objects in the list. As an alternative embodiment, for a digital object comprising text as metadata, the downsizing step may be realized by wrapping the text on the digital object in a non-overlapping way with the operable user interface element.

According to an embodiment, the operable user interface element is completely displayed within the boundaries of the selected digital object on the user interface screen leaving space for displaying at least a part of the selected digital object, but also hiding a part of the selected digital object behind the operable user interface element. In this way, the operable user interface element together with the selected digital object occupy an area which has the same size as the area occupied by the original digital object.

According to an embodiment, the method comprises the further step of displaying at least one of the other digital objects at a location different from the original location on the user interface screen in order to achieve the displaying the operable user interface element added to the selected digital object in a non-overlapping way with at least the non-selected digital objects. It is not excluded from the scope of the present invention that a digital object other than the selected digital object is displayed at a—maybe slightly or usually slightly—different position on the user interface screen. In case of a list of digital objects, subsequent digital objects may be shifted to the right, the left, the top or the bottom of the list in order to achieve a non-overlap.

According to an embodiment, the at least two digital objects of the plurality of digital objects form one of a horizontal, a vertical and a two-dimensional array. In a further embodiment, the array of the at least two digital objects is scrollable. The scrolling on a touch screen may be realized by a swiping or scrolling gesture. The scrolling on a non-touch screen with mouse equipment may be realized by adding at least one scroll bar near the array of digital objects.

According to an embodiment, the method comprises a further step of receiving user input corresponding to operating the operable user interface element and applying the function corresponding to the operable user interface element upon the digital item represented by the selected digital object. Since the movement of a finger, a mouse or a stylus from the digital object towards the operable user interface element is minimized by the addition of the selected digital object and the operable user interface element, the activation is easy and fast. If the operable user interface element is initially displayed added to a digital object on the user interface screen, an activation of the operable user interface element may also imply that the digital object, even if not explicitly selected by a selection action of the user, becomes automatically selected in order to apply the function to the digital item corresponding to the digital object.

According to an embodiment, the electronic system is an image reproduction system and the function corresponding to the operable user interface element comprises at least one of a print function, a copy function and a scan function. The image reproduction system comprises a reproduction device such as a printing engine, a copying engine and/or a scanning engine. The image reproduction system may be a printer, a camera, a copier or a scanner. The user interface screen of the electronic system may be positioned separate from or on top of the reproduction device, while a memory storing the digital items and a program of the function of the operable user interface element may be residing in a control unit inside the reproduction device or may be residing in an external system like a web server, an external server or a cloud service.

According to an alternative embodiment, the electronic system is a phone device and the function corresponding to the operable user interface element comprises a call function. Other embodiments of electronic systems according to the present invention may be envisioned as long as the electronic system has specific dedicated functions programmed in hardware and/or software. A most popular or most dedicated function of the electronic system is a good candidate for implementation as function of the operable user interface element.

In case of a print function, a digital item according to the present invention may be a document, an image, a print job or a print mail user box. In case of a copy function, a digital item may be a copy setting or a copy configuration. In case of a scan function, a digital item may be a target location of a hardcopy document to be scanned.

According to an embodiment, the operable user interface element incorporates a plurality of independent connected operable user interface elements, each of which represents another function to be activated independently of each other. In case of the image reproduction system, a print function and a preview function may be implemented in one operable user interface element. For each function, the operable user interface element has an area section for activating the function. In an embodiment, the operable user interface element itself contains two or more operable user interface elements which are framed in the containing operable user interface element.

The present invention also relates to a control unit for controlling a user interface screen connected to the control unit, the user interface screen suitable for displaying at least two of a plurality of digital objects, each of which represents a digital item, and an operable user interface element suitable for applying a corresponding function to a digital item of the plurality of digital items, a receiver configured to receive a user selection of a digital object of the plurality of digital objects, a selector configured to select the digital item upon a receipt of a user selection of the digital object, wherein the control unit is programmed to cause the user interface screen to display the operable user interface element by adding the operable user interface element to the selected digital object in a non-overlapping way with at least the non-selected digital objects of the plurality of digital objects. The user interface screen may be a local user interface screen near or at the control unit or a remote user interface screen, which is connected to the control unit via a network.

The present invention also relates to an image reproduction apparatus comprising a control unit according to the invention and a reproduction engine for applying the corresponding function, which comprises at least one of a print function, a copy function and a scan function on the digital item upon selection of the digital object and upon activation of the operable user interface element.

The present invention also relates to a computer program product embodied on a non-transitory computer readable medium that, when executed on a processor, performs a method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1B:
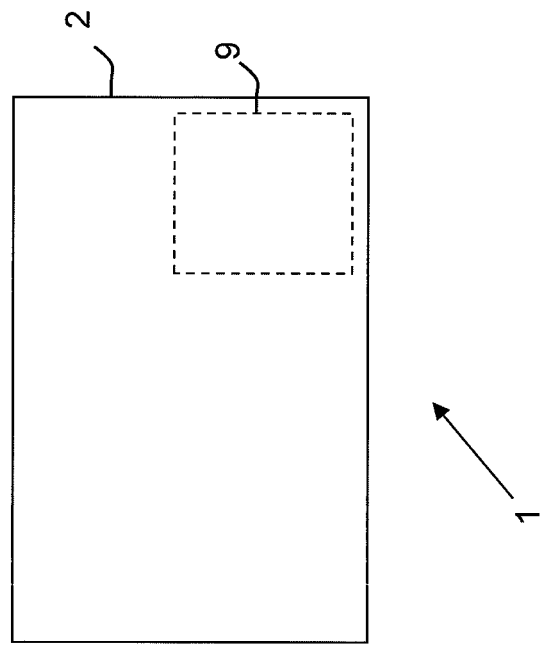
FIGS. 1A-1B are diagrams each showing a configuration of an electronic system according to the present invention.
Figure 1A:
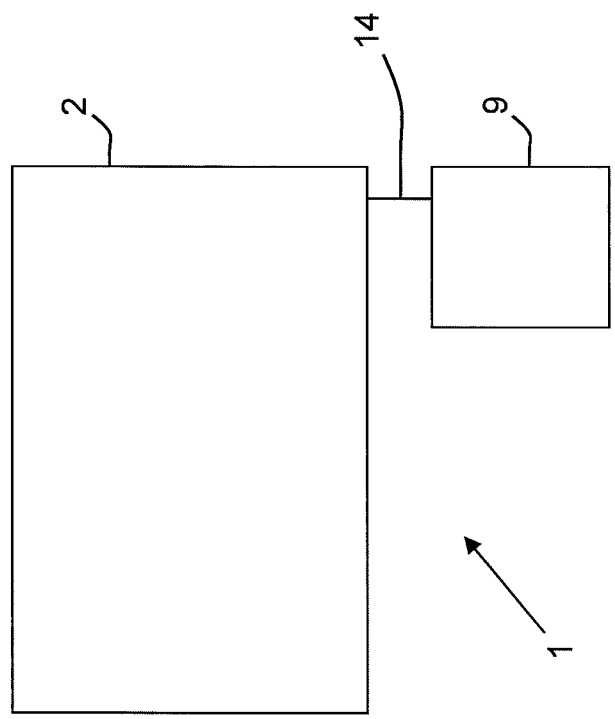

FIGS. 1A-1B illustrate an electronic system 1 comprising a user interface screen 2 connected to a controller 9, e.g. a computer system with a processor and a memory and a user interface touch screen, or an image reproduction system like a printer with a local user interface screen. The controller 9 may be integrated with the user interface screen 2 in a single holding as shown in FIG. 1B. The user interface screen 2 may be a touch screen. The controller 9 may be connected to the user interface screen 2 by a connection 14 which may be wired or wireless as shown in FIG. 1A. The electronic system 1 may be an e-reader, a tablet personal computer, a phone, a smart phone, a laptop, a notebook, a desktop computer, an intelligent white or black board or any other electronic system provided with a user interface screen suitable for user input.

Figure 2:
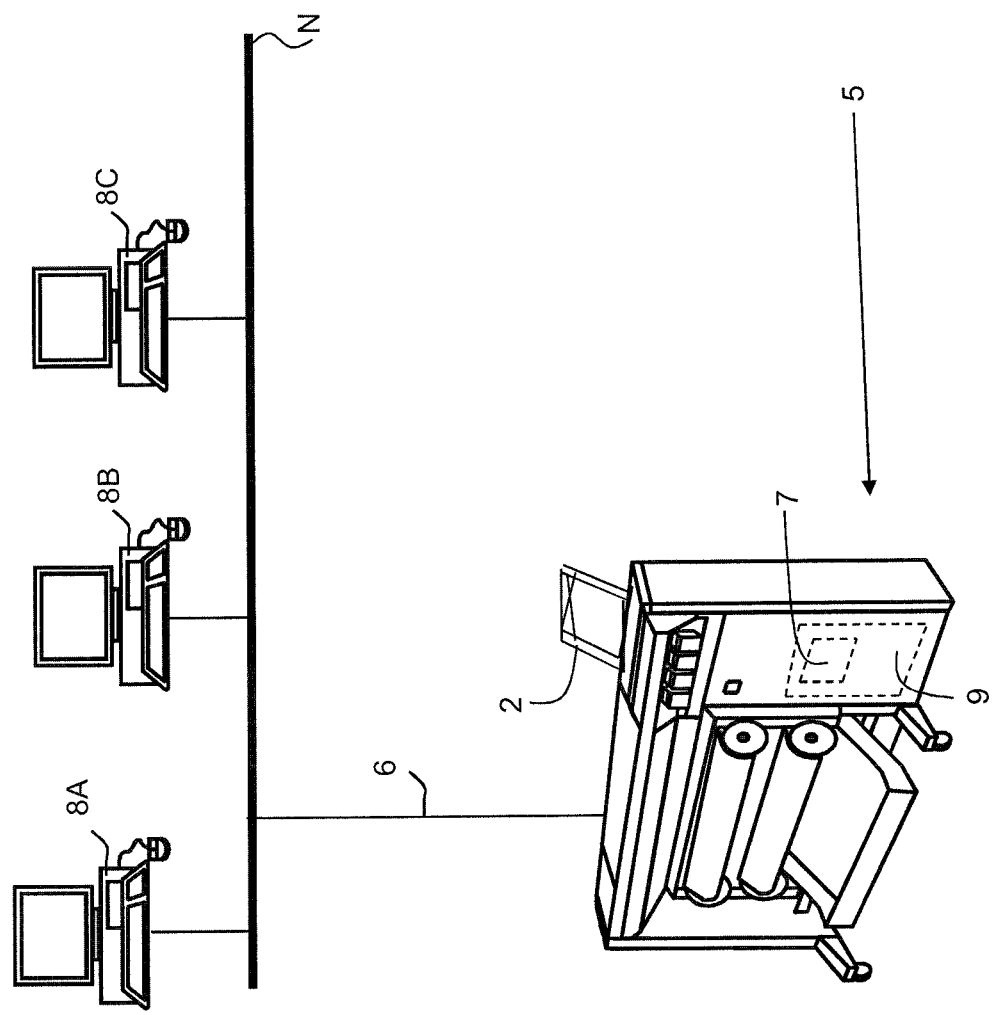
FIG. 2 illustrates a configuration of an electronic system as an image reproduction system according to the present invention.
Figure 3:
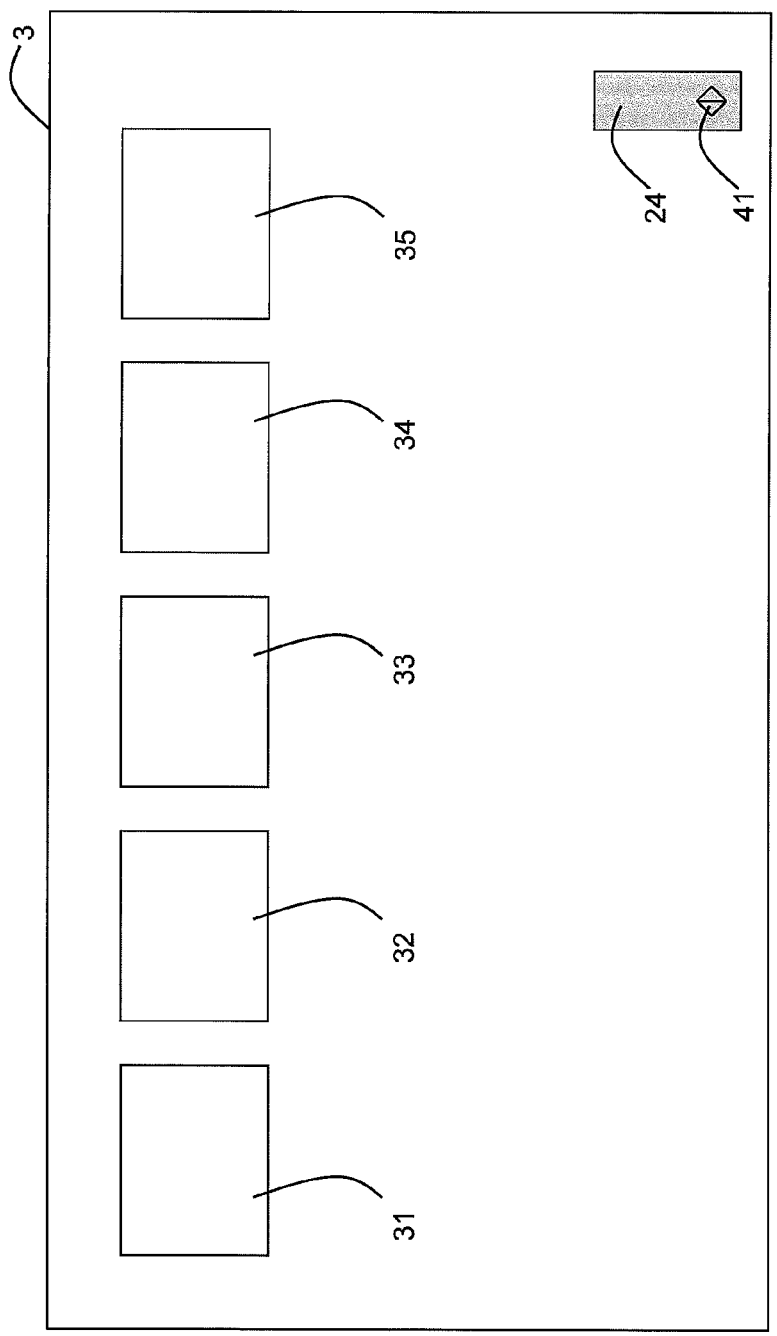
FIG. 3 illustrates a user interface screen displaying a plurality of digital objects according to the prior art.

FIG. 2 illustrates the electronic system integrated in an image reproduction system 5, for example a printer, a copier, a scanner, a multifunctional printer, a small format printer, a wide format printer, an inkjet printer, an electro-photographical printer, a printer for printing a three-dimensional object, etc. The present invention is particularly suited for use in this kind of environment, where the image reproduction system 5 is available via a network connection 6 for a user working with workstations 8A, 8B, 8C, which are connected via a network N. The user may send a print job comprising a set of digital items from the workstation 8A, 8B, 8C to the controller 9 of the image reproduction system 5. The controller 9 comprises a storage device 7 for storing print jobs, however a storage device for storing print jobs, documents or images may also be provided by an external system like a web server, a cloud service or an external server, which is connected via a network to the controller 9. The display 2 acts as a user interface screen and is suitable for displaying a digital object like a thumb nail, an icon, a text item, etc. in order to represent a digital item like an electronic document, an image, a print job, a user print mail box, etc.

The controller 9 may be suited to queue print jobs, to check whether or not the print queue is empty and to submit a document from a queued print job to the print engine of the image reproduction system 5 in order to be printed. The controller 9 may comprise a storage device 7 for storing digital items, for example documents of a print job. When a print job arrives at the image reproduction system 5 according to FIG. 2, it is stored in the control means 9.

Figure 4:
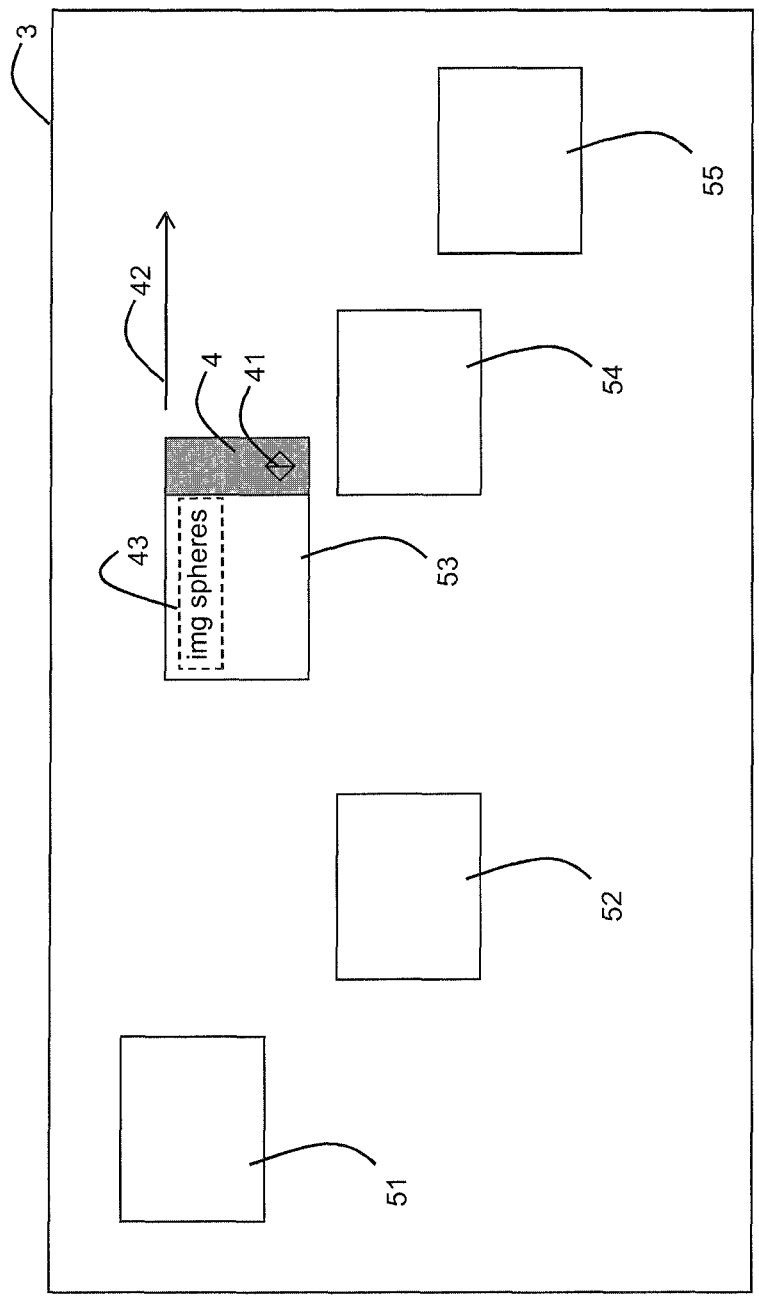
FIGS. 4-9 illustrate user interface screens displaying the plurality of digital objects according to the present invention.

FIG. 4 illustrates an embodiment of a user interface screen 3 according to the present invention displaying at least two digital objects 51-55 according to the invention. The digital objects 51-55 are arbitrarily situated on the user interface screen 3, but may be displayed in a regular order, e.g. in a line up in a vertical or horizontal direction. Each of the digital objects 51-55 represents a digital item located in memory of the electronic system or on an external storage connected to the electronic system. The memory of the electronic system comprises also at least one function code program to be invoked when applying a corresponding function on a selected digital object on the user interface screen. The digital objects are shown in a schematic way as a blank rectangle but may be filled with a representation of an image included in the digital object and/or a representation of metadata of the digital object. For example, digital object 53 is provided with metadata text 43 comprising the text "img spheres." If the digital object is a document file, the image may be a thumbnail of a first page of the document. Metadata of the digital object may be a file name, a file extension, a corresponding thumbnail, creation date or modification date of the digital object, the user or the owner of the digital object and/or a byte size of the digital object in memory. The user interface screen 3 also displays an operable user interface element 4 adjacent to the digital object 53. The digital object 53 may be predetermined for displaying the operable user interface element 4 adjacent to it by determination criteria programmed in the controler. Examples of criteria are the last used, last selected, last printed, the most left, the most right, the uppermost, or the lowermost digital object among the plurality of digital objects.

In FIG. 4, the operable user interface element 4 is provided with an icon 41 indicating that the function code program in memory corresponding to the operable user interface element 41 is a printing function. The user interface element 4 may be easily distinguishable by its color, for example a green color. A side of the user interface element 4 fits a side of the digital object 53 in order to achieve an aesthetic view at the user interface screen 3. On the user interface screen 3, a plurality of digital objects 51-55 are present in an arbitrary position. The digital item, which corresponds to the selected digital object 53, is suitable for printing. An arrow 42 indicates a direction in which a user has the intention to move the digital object 53 on the user interface screen 3.

Figure 5:
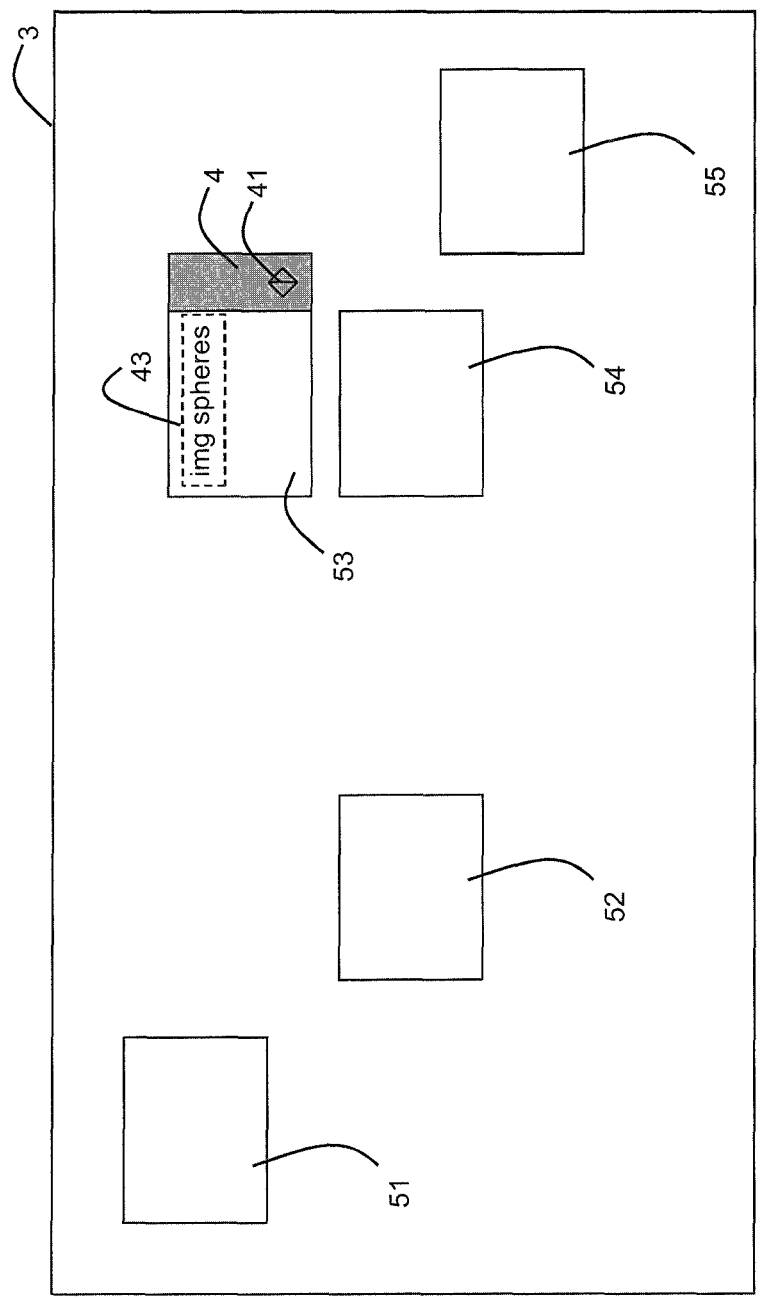

FIG. 5 shows the user interface screen according to FIG. 4 after moving the digital object 53 in the direction of arrow 42. The move of the digital object 53 may be a click with a mouse on the digital object 53 and keeping the mouse button pressed and simultaneously dragging the digital object 53. The move of the digital object 53 may a touch with a finger or stylus in case of a touch screen and holding the finger, stylus on the digital object 53 and dragging the digital object 53 in the direction of the arrow 42 of FIG. 4 until a wished position on the user interface screen 3 is reached. While moving the digital object 53, the operable user interface element 4 is moving in the same direction with the same speed. The digital object 53 and the operable user interface element 4 seem to be inseparable. The relative position of the object 53 with respect to the operable user interface element 4 remains the same during the complete move. When the operable user interface element 4 is activated, the corresponding function code program in memory is invoked and the digital item corresponding to the digital object 53 will be printed. The printing may take place on a reproduction apparatus which is connected—wired or wireless—to the electronic system comprising the user interface screen 3. It is noted that the digital object 53 does not have to be selected in order to apply the function code program to it. However, an activation of the operable user interface element 4 may imply an automatic selection of the digital object 53.

Figure 6:
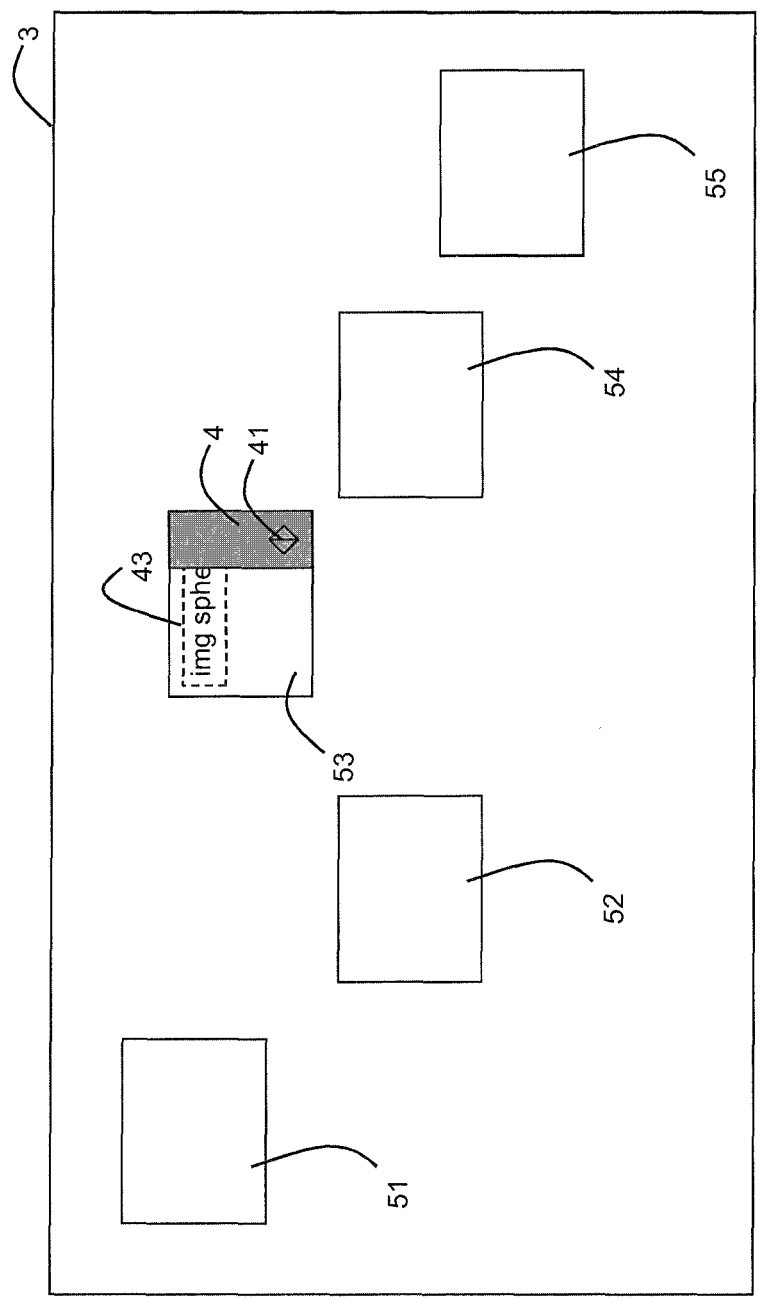

Instead of FIG. 4, FIG. 6 shows an alternative embodiment of the displaying of the operable user interface element 4 according to the method of the present invention. The operable user interface element 4 is added to the selected digital object 53 completely within the boundaries of the selected digital object 53. Part of the metadata 43 on the digital object 53 is not visible anymore or is slightly visible but not readable any more at its original position, since the overlaid operable user interface element 4 is displayed. The size of the area on the user interface screen 3 occupied by the digital object 53 together with the operable user interface element 4 is the same as the size of the area originally occupied by the digital object 53 before the selection of the digital object 53.

Figure 7:
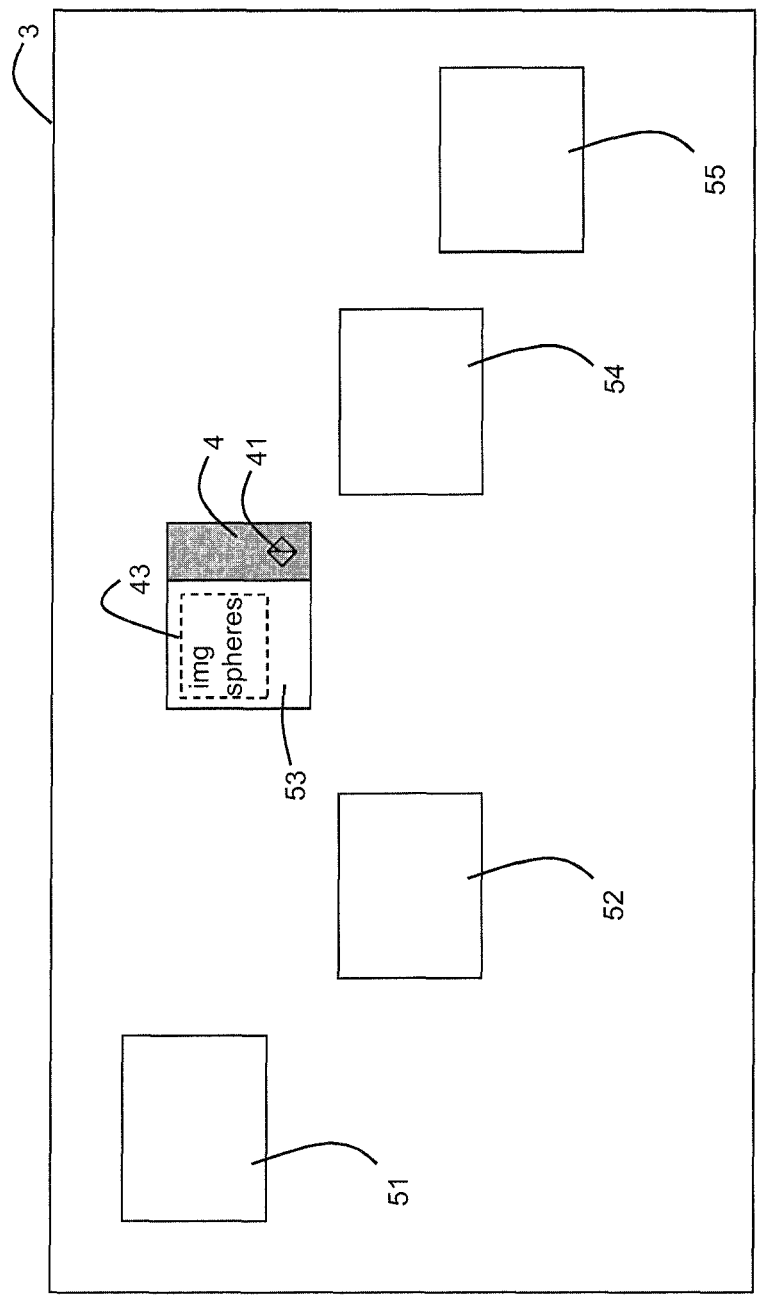

In FIG. 7, an alternative embodiment of displaying of the digital object 53 is shown. In order to avoid a partly invisible metadata text 43 as in FIG. 6, the metadata text 43 is made completely visible by wrapping the metadata text 43 at the area of the visible part of the digital object 53.

Figure 8:
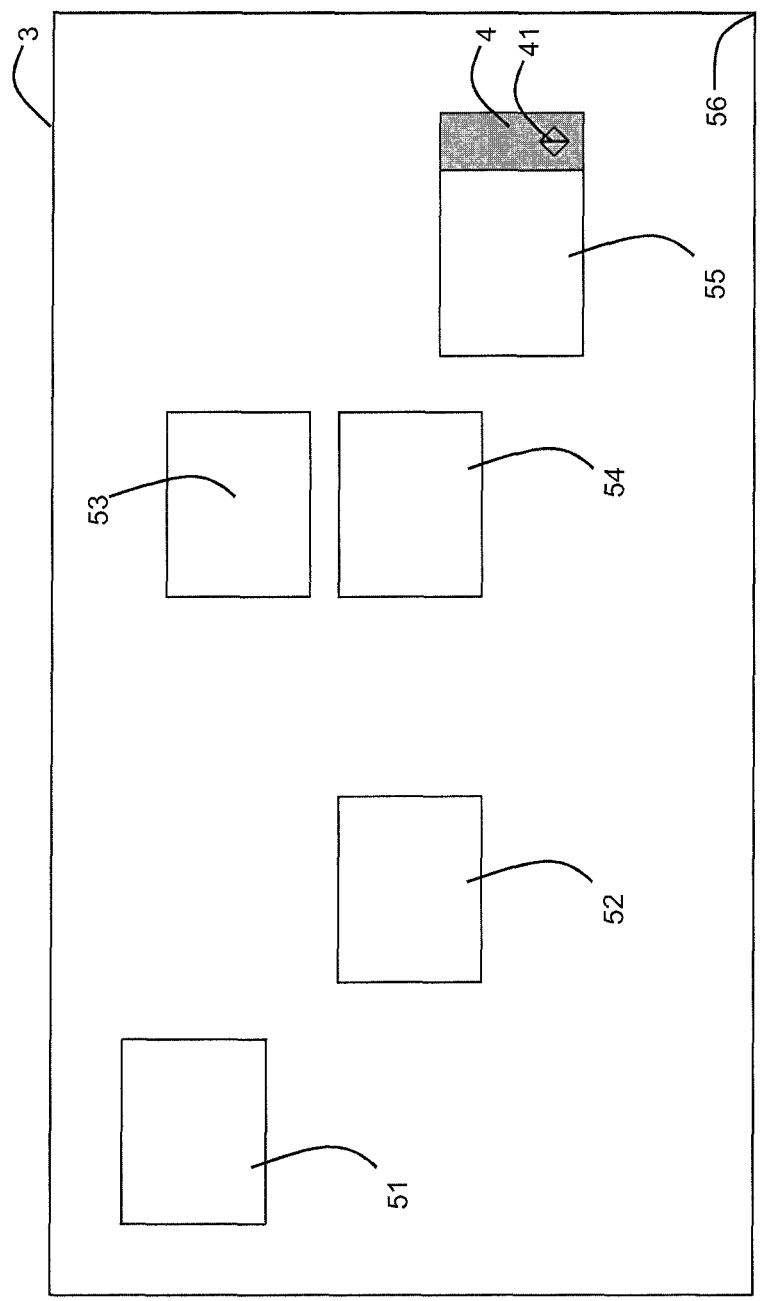

FIG. 8 illustrates the user interface screen 3 again after the digital object 55 is selected by the user at the user interface screen shown in FIG. 5. The selection may be established by tapping on, clicking on or touching the digital object 55 on the user interface screen 3. Immediately after the selection, the operable user interface element 4 is hidden at its location adjacent to digital object 53 (See FIG. 5) and appears adjacent to the selected digital object 55. Instead of adjacent positioning, a positioning of the operable user interface element 4 within the boundaries of the digital object 55 may be applied as explained according to FIG. 6 and FIG. 7.

Now, an alternative embodiment of the method according to the present invention will be explained. FIG. 8 is taken as a starting situation for this embodiment. According to this alternative embodiment, the operable user interface element 4 always stays at a predetermined location at the user interface screen 3, for example near the right lower corner 56 of the user interface screen 3. The operable user interface element 4 is always accompanied with a digital object of the plurality of digital objects 51-55, which is positioned adjacent to the operable user interface element 4. The operable user interface element may be positioned within the boundaries of the digital object. In FIG. 8, the operable user interface element 4 is accompanied by the digital object 55. As soon as, for example, digital object 54 is selected in FIG. 8, the selected digital object 54 is hidden at its original position and emerges on the user interface screen 3 at the predetermined position at the user interface screen 3, in this example near the right lower corner 56 of the user interface screen 3.

Figure 9:
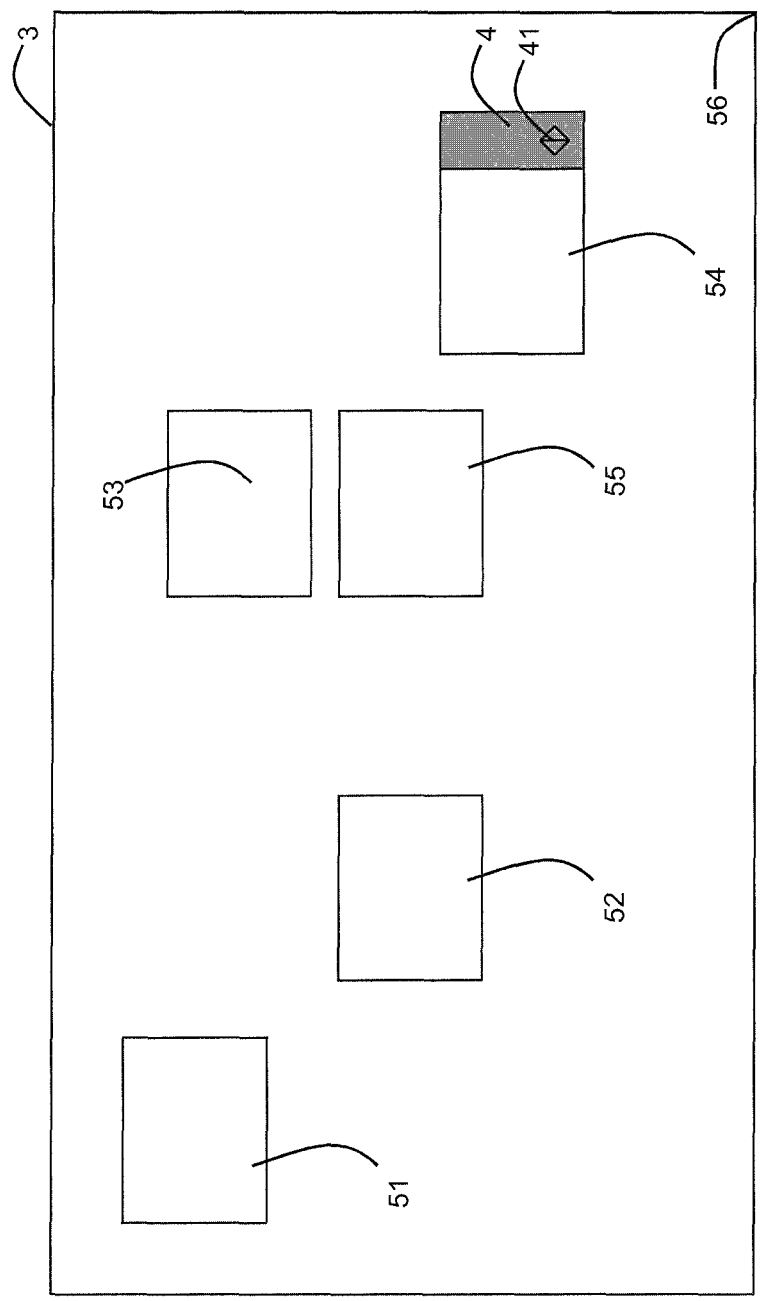

The situation after the selection is shown in FIG. 9. Any digital object, which was present near the right lower corner 36 before the selection, in this example digital object 55, is moved to another free location on the user interface screen 3 after the selection of digital object 54. It is noted that there is always another location available, for example the previous location of the selected digital object 54 on the user interface screen 3. In the latter case, the user gets the impression that the selection establishes a swapping of positions of the digital objects 54 and 55 on the user interface screen 3. This latter case is shown in FIG. 9. This swapping mechanism may also be applied when the plurality of digital objects form a vertical, a horizontal or a two-dimensional array.

Figure 10:
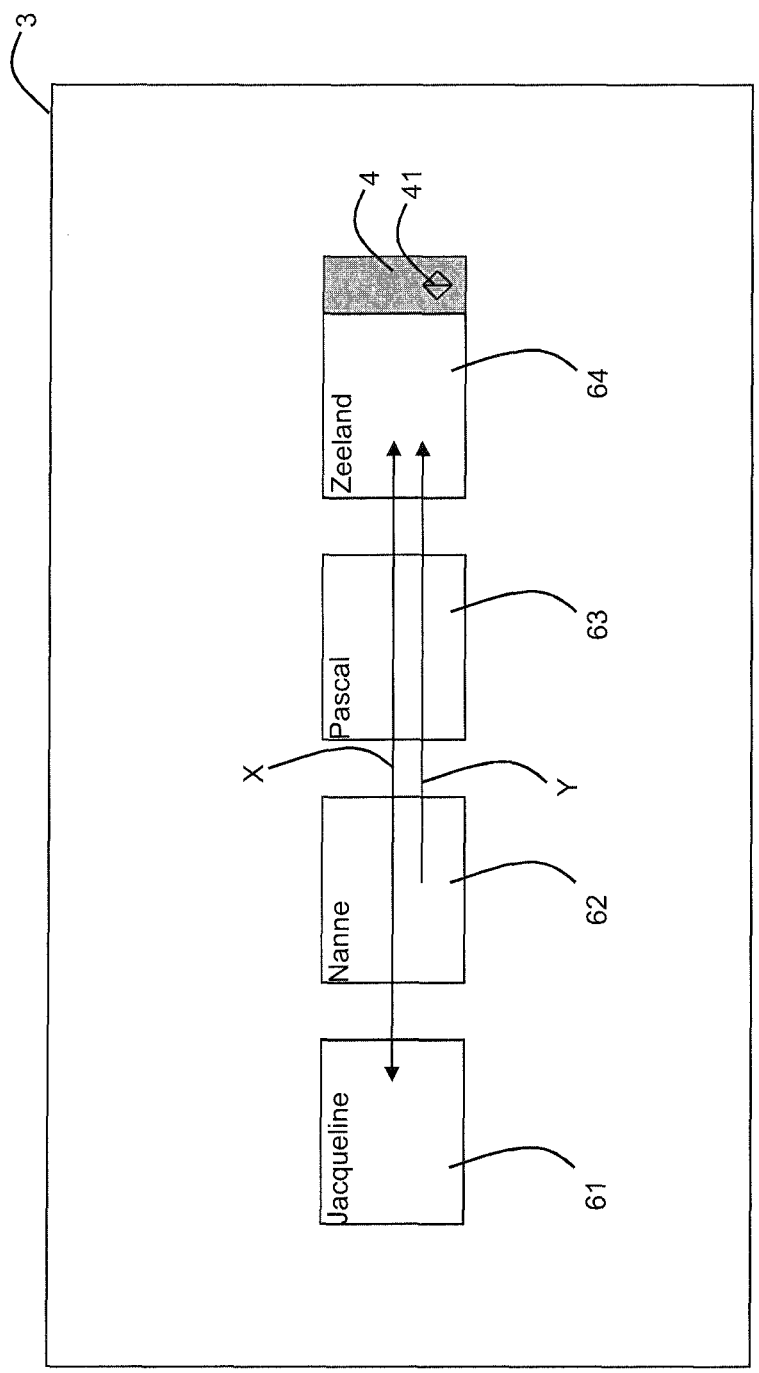
FIGS. 10-15 illustrate user interface screens displaying a list of digital objects according to the present invention.

FIG. 10 illustrates another embodiment in case the array is a scrollable list. According to this embodiment, a scrollable list of digital objects is displayed on the user interface screen 3. When the list comprises more digital objects than can be fit on the user interface screen 3, the controller is configured to select a part of the list for display at the user interface screen 3. FIG. 8 illustrates the user interface screen 3 displaying a part of the scrollable list of digital objects, namely digital objects 61-64. A digital object of the list may represent a print job, a digital image, a contact address, a telephone address, a print mail box, a destination resource or any other kind of digital item.

In FIG. 10, each digital object 61-64 represents a print mail box of a user. The visible print mail boxes 61-64 are respectively named Jacqueline, Nanne, Pascal and Zeeland to their respective user. The names of the print mail boxes are visible on the digital objects 61-64. According to the embodiment shown in FIG. 10, the operable user interface element 4 is always visible and therefore attached to the most right digital object 64 in the visible list of digital objects 61-64. Each digital object 61-64 visible on the user interface screen 3 represents a print mail box of a user, but there may be more print mail boxes to be represented in the scrollable list. Digital objects representing the more print mail boxes are not yet visible on the user interface screen 3, but may become visible when scrolling the list of digital objects 61-64 in a direction equaling one of the two directions indicated by an arrow X. The scrolling of the list is established by scrolling bars besides the list and the use of a mouse or by swiping the list by a stylus or a human finger in case the user interface screen 3 is a touch screen.

Figure 11:
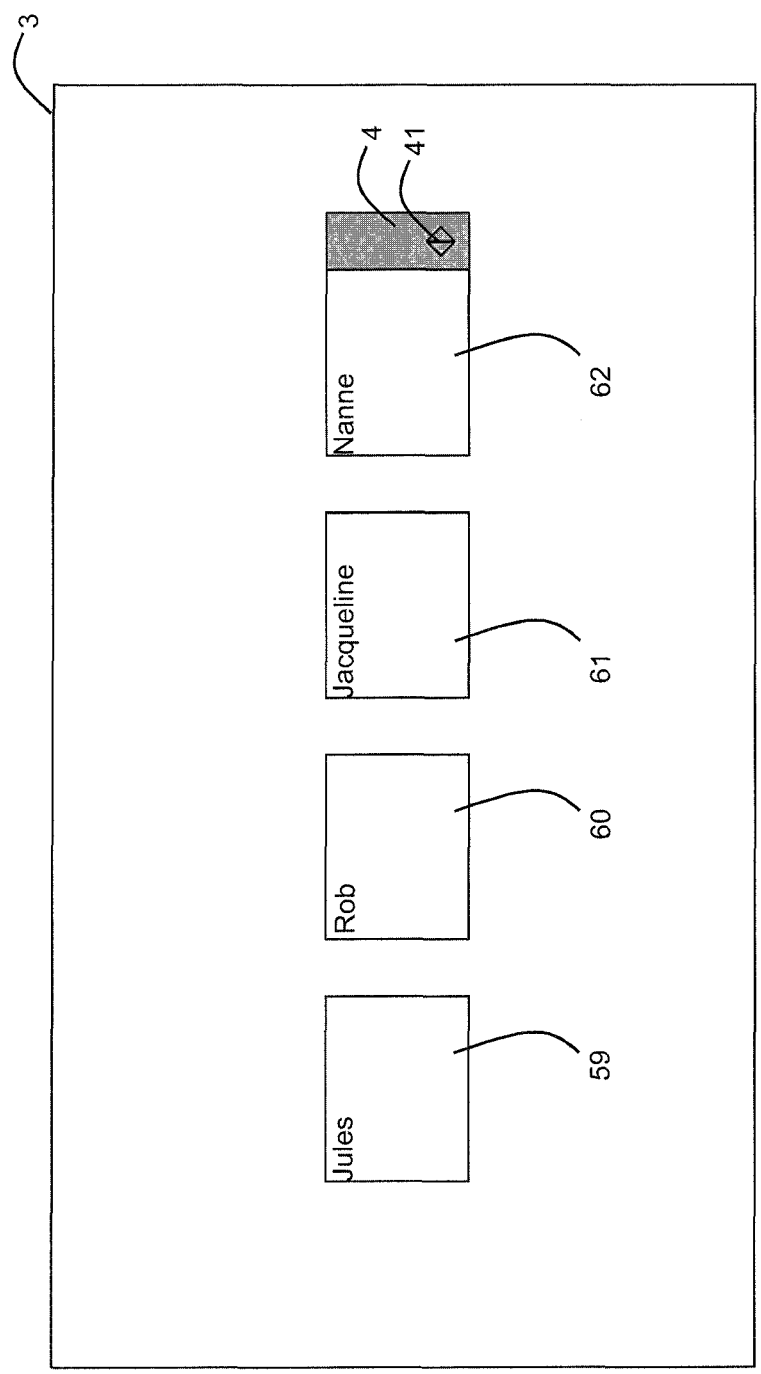

FIG. 11 illustrates the user interface screen 3 according to FIG. 10 after scrolling through the list in a direction indicated by arrow Y in FIG. 10 such that the digital object 62 arrives at the right most visible position in the list on the user interface screen 3. The operable user interface element 4 is not displayed in another location on the user interface screen 3, but remains in its original position. The digital object 62 is now adjacent to the operable user interface element 4. If the digital object 62 represents a print mail box of user Nanne, activation of the operable user interface element 4 leads to the printing of all documents residing in the print mail box corresponding to the digital object 62. If the digital object 62 represents a print job submitted by user Nanne, activation of the operable user interface element 4 leads to the printing of all documents comprised in the print job corresponding to the digital object 62. If the digital object 62 represents a digital image whose owner is user Nanne, activation of the operable user interface element 4 leads to the printing of the digital image corresponding to the digital object 62. The function coupled to the operable user interface element 4 may be—besides a printing function—a preview function for previewing a document to be printed, an open function for opening a document by an appropriate application, a delete function for removing the digital object and corresponding digital item, etc.

In another embodiment, the situation of FIG. 11 is reached by selecting the digital object 62 in FIG. 10 by positioning the mouse pointer on the digital object 62 and clicking on a mouse button. In case of a touch screen, the digital object 62 may be selected by touching the digital object 62 by a finger or a stylus or any other touching device. When the selection is performed, the digital object 62 is moved to the right most position in the visible list adjacent to the operable user interface element 4. Other digital objects 59-60 become visible at the user interface screen representing the mailboxes of Jules and Rob, respectively, while the digital objects 63-64, which were originally visible at the user interface screen 3 on the right side of the digital object 62 are not visible any more.

In this way, the operable user interface element 4 always stays in view in the list on the user interface screen 3.

Figure 12:
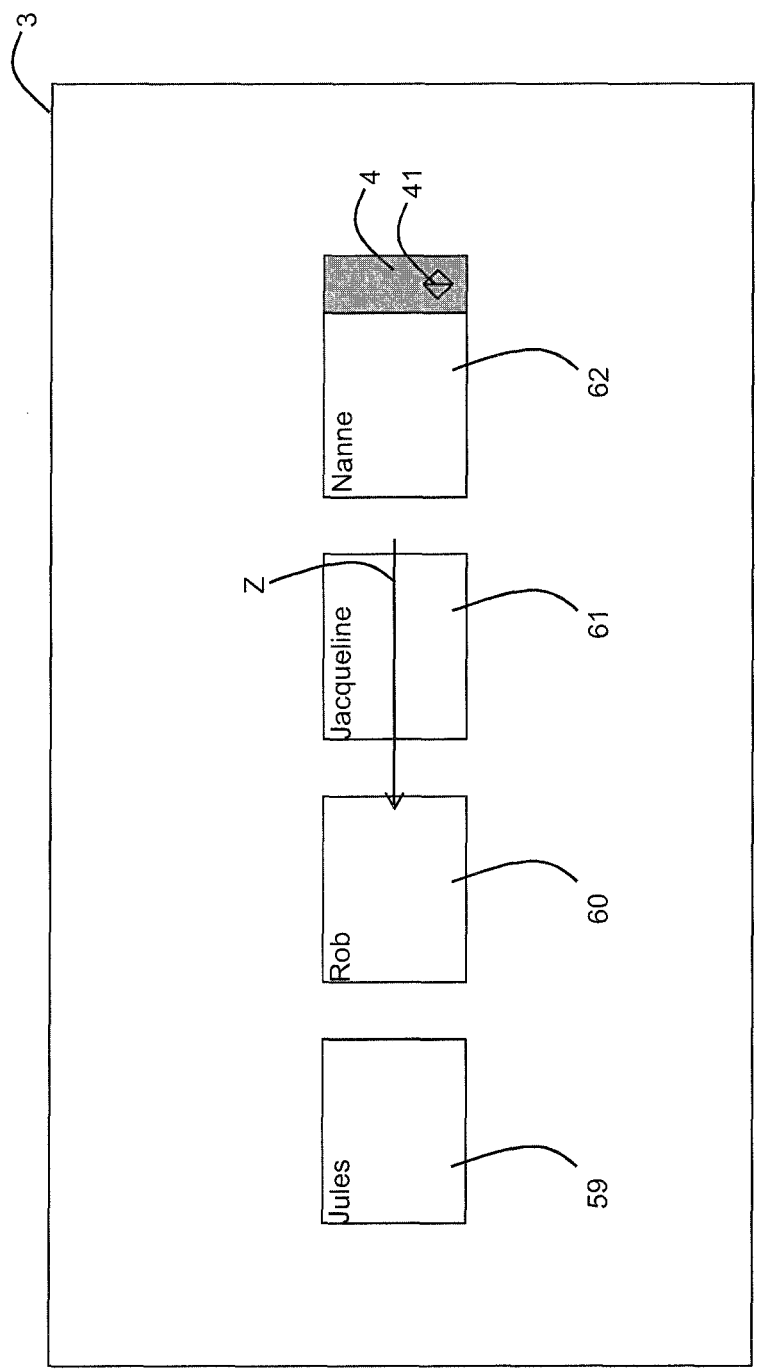
Figure 13:
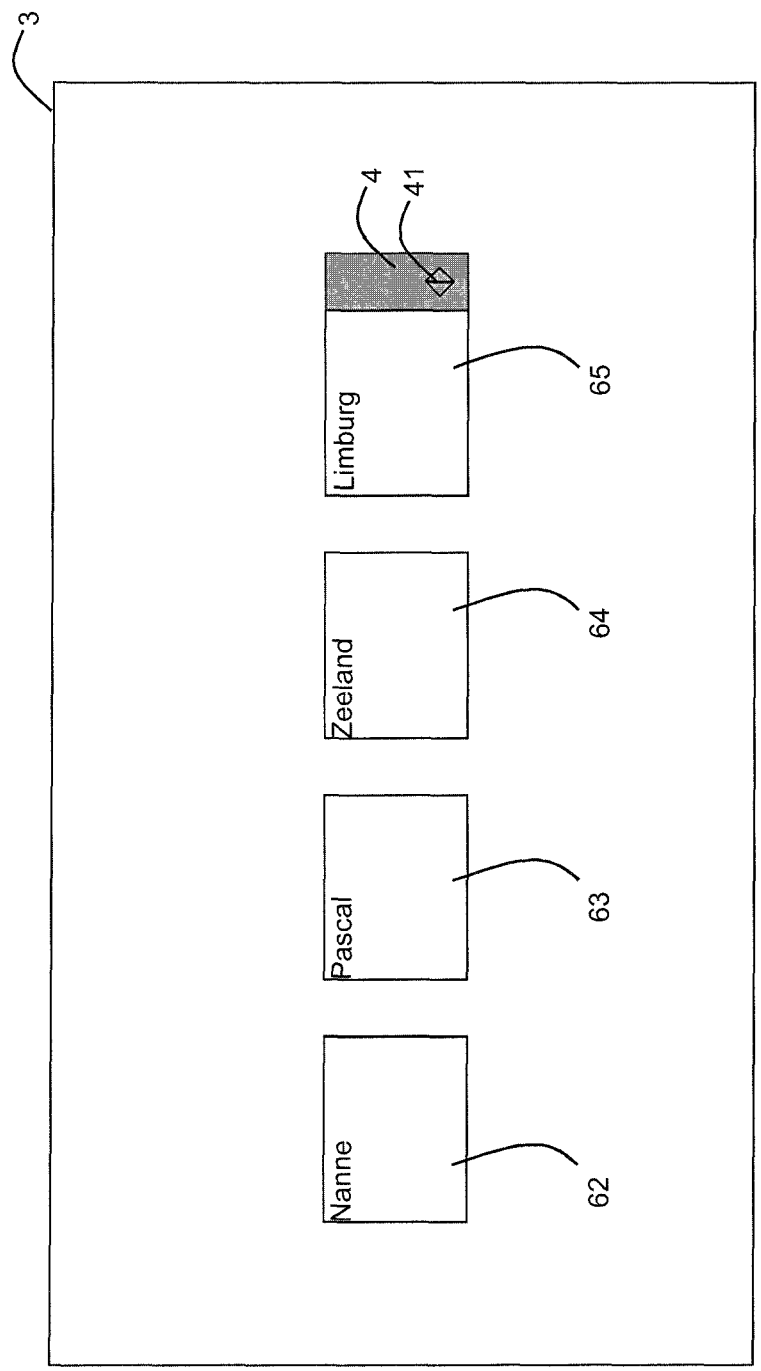

FIG. 12 illustrates the user interface screen 3 according to FIG. 11 and now the user intends to scroll the list of digital objects in a direction indicated by arrow Z. After scrolling through the list in a direction indicated by arrow Z, the digital object 62 arrives at the left most visible position in the list on the user interface screen 3 as shown in FIG. 13. The operable user interface element 4 is not translated but remains in the original position. The digital object 65 belonging to print mailbox named "Limburg" is now adjacent to the operable user interface element 4.

Figure 14:
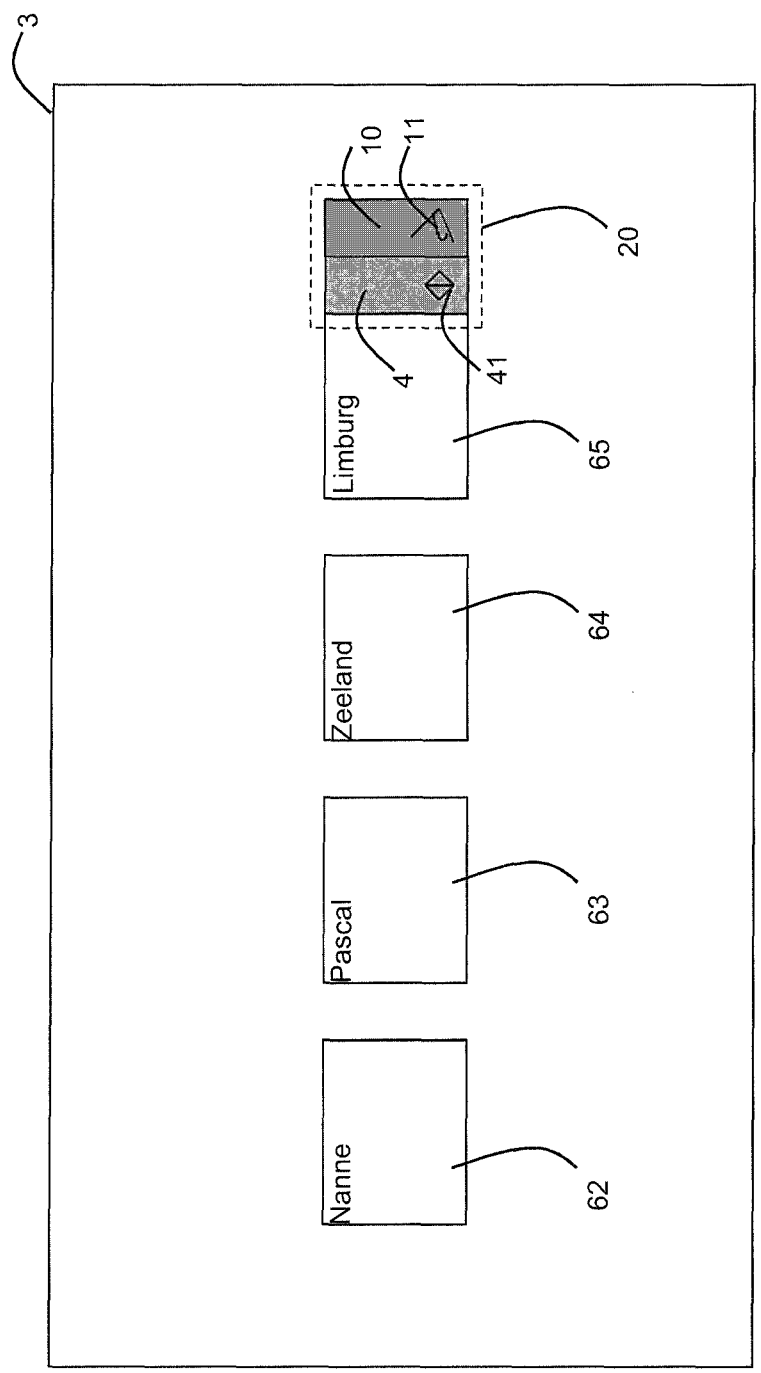

FIG. 14 illustrates a further embodiment in which the operable user interface element may represent a plurality of function code programs. The operable user interface element 20—circumvented by a dashed rectangle—may incorporate a plurality of connected and independently operable user interface elements 4, 10, each of which represents another function and may be activated independent of each other. For example, the first operable user interface element 4 comprising an icon 41 is used for the print function, while a second operable user interface element 10 comprising an icon 11 is used for a preview function. The plurality of connected operable user interface elements 4, 10 may also be distinguished from each other by their color or by any other visibly distinguishable feature. Which one of the print function and the preview function is activated, depends on which area of the larger operable user interface element 20 is activated. In FIG. 14, a first area containing the first operable user interface element 4 executes a print function when activated, while a second area containing the second operable user interface element 10 executes a preview function when activated.

In a further embodiment, more than one digital object of the at least two digital objects is selected by a multi-select procedure. Such a multi-select procedure may be implemented by selecting an additional digital object and leaving the originally selected digital object still selected together with the newly selected digital object. This embodiment may be implemented by introducing a long click on any digital object which is to be selected additionally to a previously selected digital object. An operable user interface element emerges adjacent to the additional digital object. De-selecting an already selected digital object may be implemented by clicking or touching the already selected digital object once again and hiding the adjacent operable user interface element. If a plurality of digital objects is selected, the activation of one of the adjacent operable user interface elements may result in applying the function on all selected digital objects.

Figure 15:
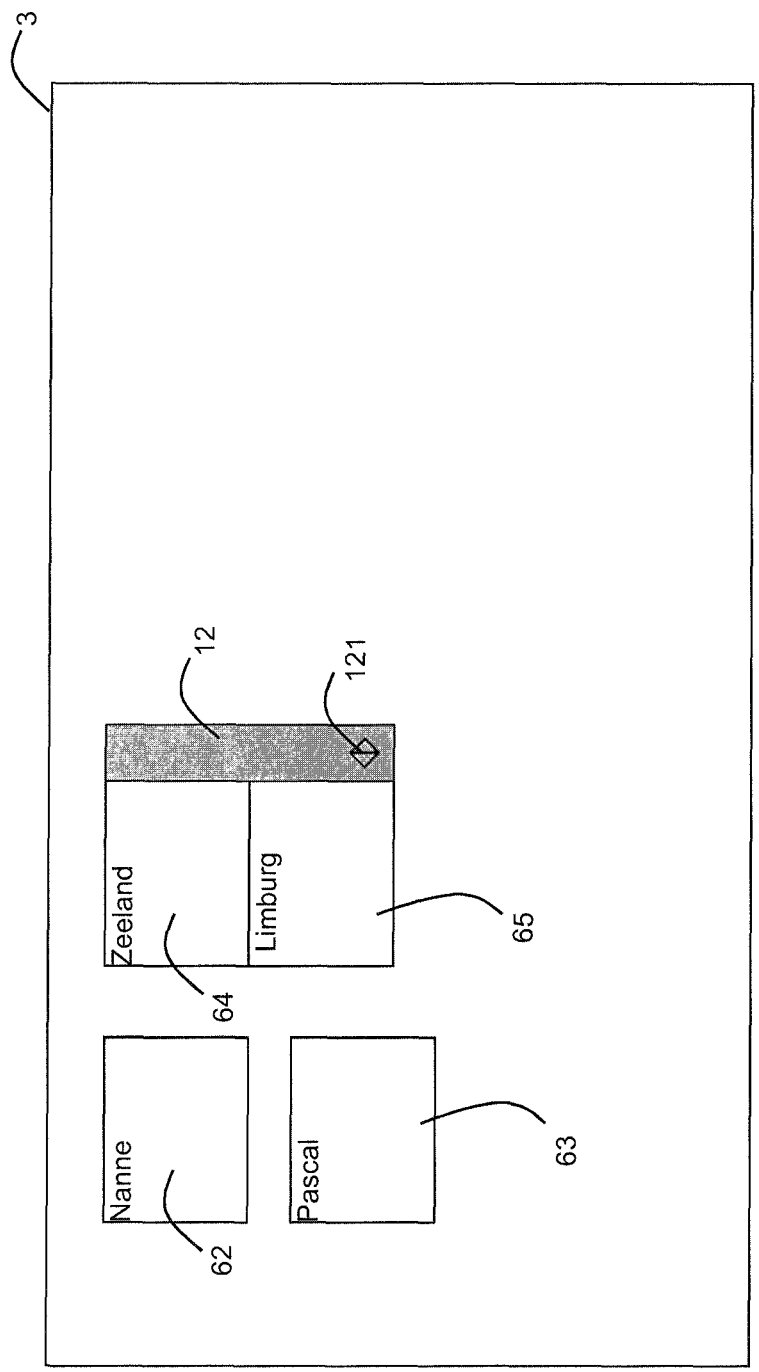

In a further embodiment, the multi-selected digital objects are displayed adjacent to each other, while adjacent to the multi-selected digital objects, one large operable user interface element is displayed, which fits to a total width of the multi-selected digital objects. An example is shown in FIG. 15. Four digital objects 62-65 are displayed in a two-dimensional array. Two digital objects 64-65 are selected. When more than one digital object is selected, they are moved toward each other until they become adjacent. Along the adjacent selected digital objects 64-65, the operable user interface element 12, with its characteristic icon 121, appears in an elongated form, which fits the total width or height of the selected digital objects 64-65. When activating the operable user interface element 11, the corresponding function is applied on all selected digital objects 64-65.

Figure 16:
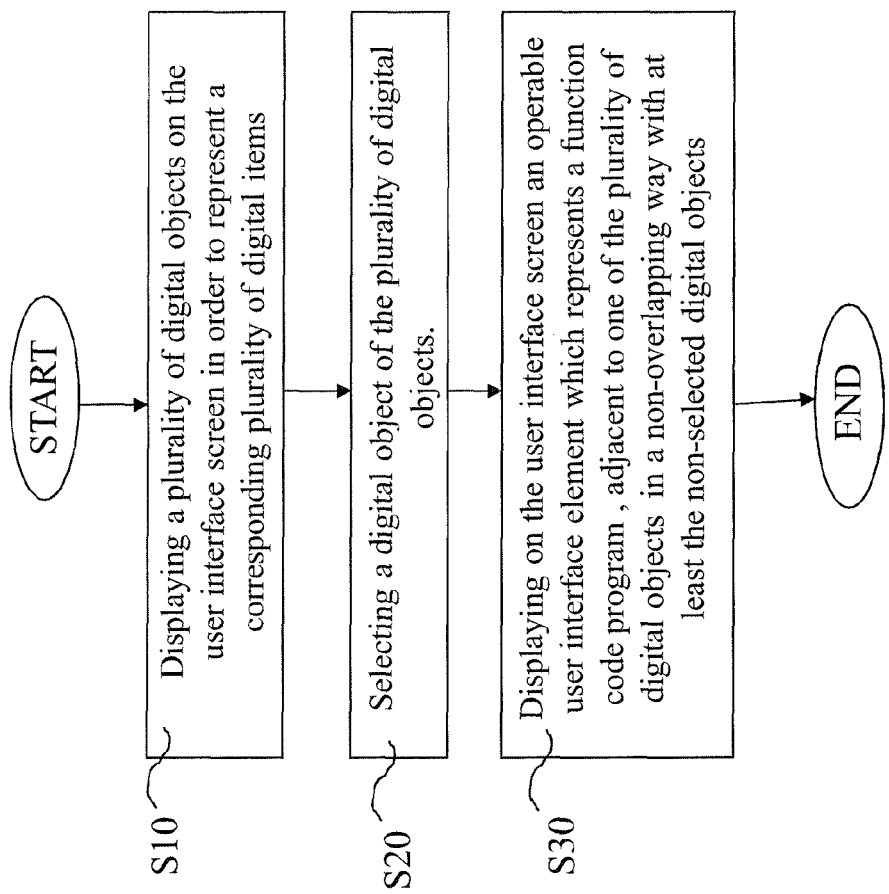
FIG. 16 illustrates a flow diagram of a method according to the present invention.

FIG. 16 illustrates a flow diagram of the method according to the present invention.

In a first step S10, a plurality of digital objects is displayed on the user interface screen in order to represent a corresponding plurality of digital items which may reside in the memory of the electronic system.

In a second step S20, a digital object of the plurality of digital objects is selected.

In a third step S30, an operable user interface element is displayed on the user interface screen. The operable user interface element represents a function code program, which may reside in memory of the electronic system. The operable user interface element is displayed adjacent to one of the plurality of digital objects. Moreover, the operable user interface element is displayed in a non-overlapping way with at least the non-selected digital objects displayed at the user interface screen.

In an additional optional step (not shown), the operable user interface element is activated and the function code program corresponding to the operable user interface element is applied on the digital item corresponding to the digital object.

All foregoing described embodiments are suitable to be combined with or to be incorporated in the steps S10-S30 of the flow diagram of FIG. 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented method for displaying a plurality of digital representative objects on a user interface screen of an electronic system, each of the plurality of digital representative objects representing a digital item, the method comprising steps of:
   displaying initially at least two of the plurality of digital representative objects on the user interface screen;
   displaying an operable user interface element at a first initial position adjacent to a selected digital representative object on the user interface screen in a non-overlapping way with the selected digital representative object, said operable user interface element representing a function to be applied on the digital item corresponding to the selected digital representative object when the operable user interface element is operated;
   selecting a digital representative object of the displayed at least two of the plurality of digital representative objects at a second initial position on the user interface screen, the second initial position being different from the first initial position;
   in response to selecting the digital representative object of the displayed at least two of the plurality of digital representative objects, automatically adding the selected digital representative object to the operable user interface element at the first initial position in a non-overlapping way with at least non-selected digital representative objects of the plurality of digital representative objects; and
   wherein the step of automatically adding the selected digital representative object to the operable user interface element further comprises the step of automatically hiding the selected digital representative object at the second initial position of the selected digital representative object and displaying the selected digital representative object by automatically adding the selected digital representative object to the operable user interface element at the first initial position of the operable user interface element on the user interface screen.

2. The method according to claim 1, wherein the step of displaying the operable user interface element adjacent to the selected digital representative object further comprises the step of downsizing the digital representative object to create an amount of free space on the user interface screen and displaying the operable user interface element adjacent to the downsized digital representative object within the created free space on the user interface screen.

3. The method according to claim 1, wherein the operable user interface element is completely displayed within the boundaries of the selected digital representative object on the user interface screen leaving space for displaying at least a part of the selected digital representative object.

4. The method according to claim 1, further comprising the step of displaying at least one of the other digital representative objects of the displayed at least two of the plurality of digital representative objects at a location different from its original location on the user interface screen in order to achieve the displaying the operable user interface element added to the selected digital representative object in a non-overlapping way with at least the non-selected digital representative objects.

5. The method according to claim 1, wherein the at least two digital representative objects of the plurality of digital representative objects form one of a horizontal, a vertical and a two-dimensional array.

6. The method according to claim 1, further comprising the step of receiving user input corresponding to operating the operable user interface element and applying the function corresponding to the operable user interface element upon the digital item represented by the selected digital representative object.

7. The method according to claim 1, wherein the electronic system is an image reproduction system and the function corresponding to the operable user interface element comprises at least one of a print function, a copy function and a scan function.

8. The method according to claim 1, wherein the electronic system is a phone device and the function corresponding to the operable user interface element comprises a call function.

9. The method according to claim 1, wherein the operable user interface element incorporates a plurality of connected operable user interface elements, each of which represents another function to be activated independently of each other.

10. A computer program product embodied on a non-transitory computer readable medium that, when executed on a processor, performs the method according to claim 1.

11. An image reproduction apparatus comprising:
   a processor for controlling a user interface screen connected to the processor, the user interface screen being suitable for displaying initially at least two of a plurality of digital representative objects, each of which represents a digital item, and an operable user interface element at a first initial position adjacent to a selected digital representative object on the user interface screen in a non-overlapping way with the selected digital representative object, said operable user interface element representing a function to be applied on the digital item corresponding to the selected digital representative object when the operable user interface element is operated, the processor being configured to receive a user selection of a digital representative object of the plurality of digital representative objects, and select the digital item upon a receipt of the user selection of the digital representative object,
   wherein the processor is programmed to cause the user interface screen to display the operable user interface element, and, after said digital representative object of the displayed at least two of the plurality of digital representative objects is selected at a second initial position on the user interface screen, the second initial position being different from the first initial position, to automatically add the selected digital representative object to the operable user interface element at the first initial position in a non-overlapping way with at least non-selected digital representative objects of the plurality of digital representative objects by automatically hiding the selected digital representative object at the second initial position of the selected digital representative object and displaying the selected digital representative object by automatically adding the selected digital representative object to the operable user interface element at the first initial position of the operable user interface element on the user interface screen.

12. The image reproduction apparatus of claim 11, wherein the image reproduction apparatus further comprising:
a reproduction processor for applying the corresponding function, which comprises at least one of a print function, a copy function and a scan function on the digital item upon selection of the digital representative object and upon activation of the operable user interface element.

* * * * *